Dec. 15, 1970   J. J. SHUTTLEWORTH   3,546,837
LIVE PAN ASSEMBLY
Filed March 21, 1969   3 Sheets-Sheet 1
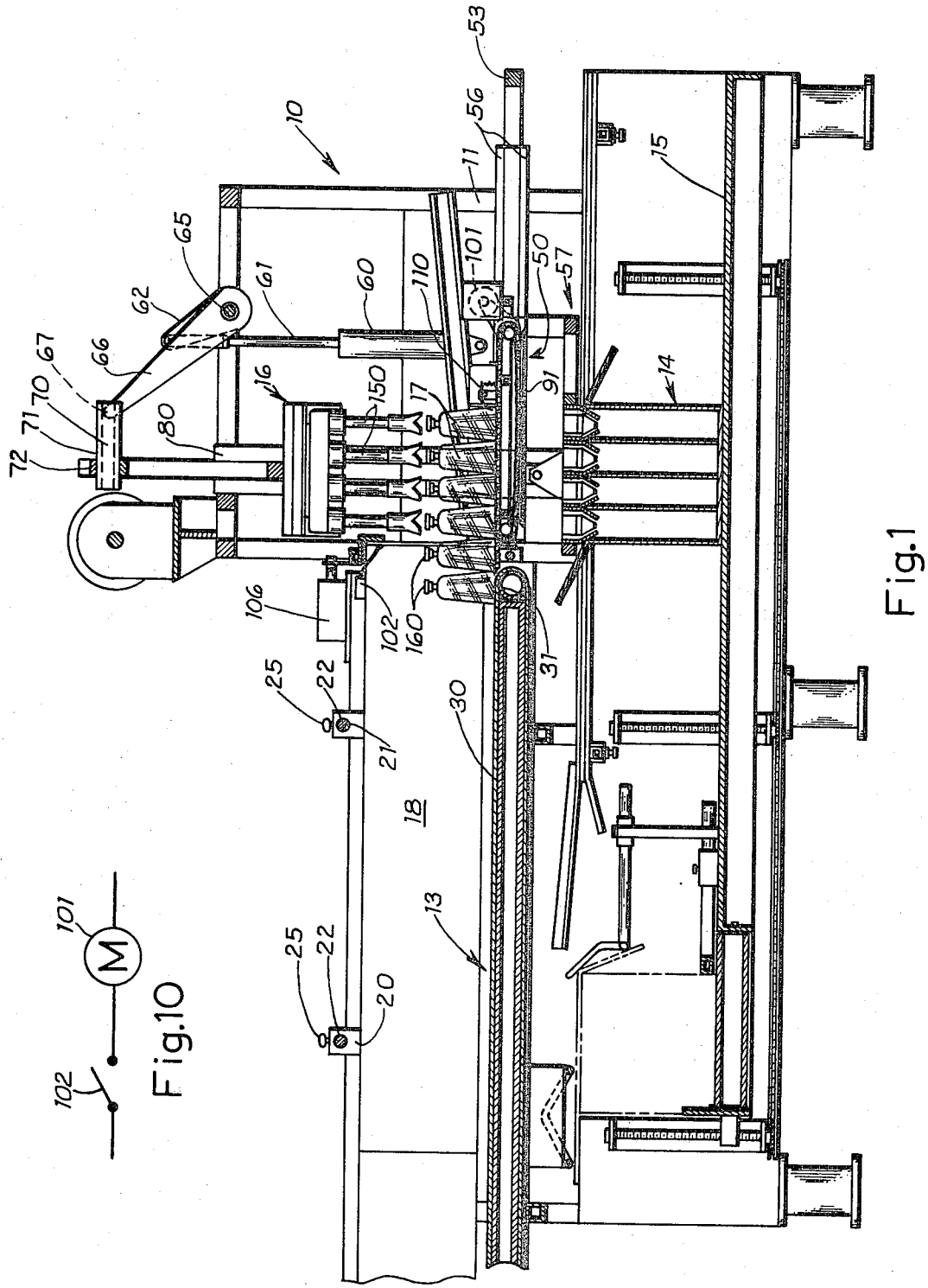
INVENTOR.
JAMES J. SHUTTLEWORTH
BY
Woodard, Weikart, Emhardt & Naughton
ATTORNEYS

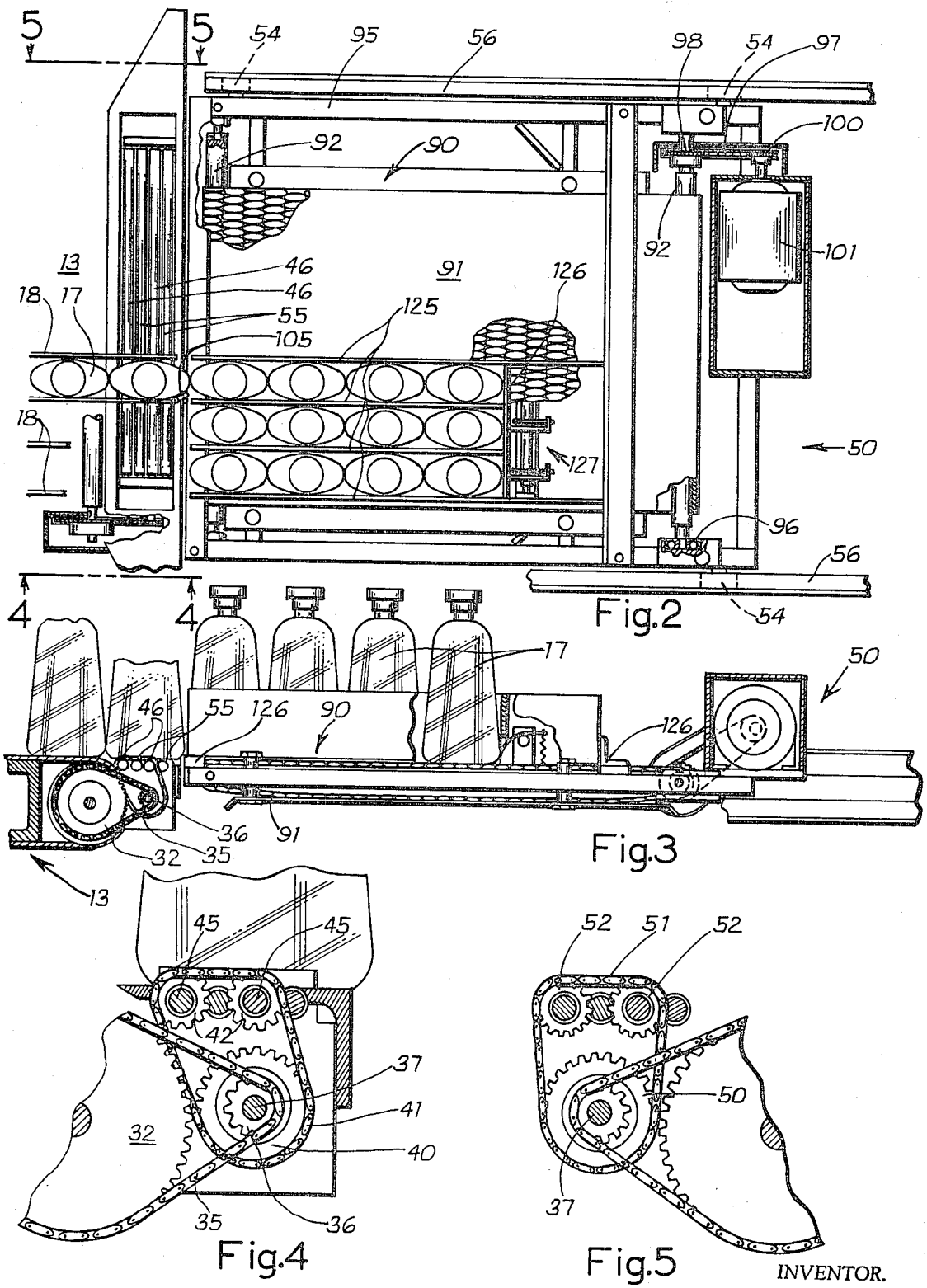

Dec. 15, 1970   J. J. SHUTTLEWORTH   3,546,837
LIVE PAN ASSEMBLY

Filed March 21, 1969   3 Sheets-Sheet 3

INVENTOR.
JAMES J. SHUTTLEWORTH
BY
Woodard, Weikart, Emhardt & Naughton
ATTORNEYS

United States Patent Office 3,546,837
Patented Dec. 15, 1970

3,546,837
LIVE PAN ASSEMBLY
James J. Shuttleworth, 1300 Salamonie Ave.,
Huntington, Ind. 46750
Filed Mar. 21, 1969, Ser. No. 809,128
Int. Cl. B65b 5/08, 57/12
U.S. Cl. 53—61            8 Claims

ABSTRACT OF THE DISCLOSURE

A first bottle conveyor mounted on a movable "pan" or platform for conveying the bottles across the platform as they move onto the platform from a second bottle conveyor. A vacuum head is positioned above the platform and moves vertically to pick up the bottles on the platform. A case conveyor positions cases for loading below the platform. The first bottle conveyor is arranged to operate only when it is adjacent the second bottle conveyor.

BACKGROUND OF THE INVENTION

Field of the invention

This invention relates to case packing apparatus particularly adapted for packing flat bottles and the like in a case or box and to certain sub-combinations thereof.

Description of the prior art

Various devices are commercially available for packing cases, jars, bottles and the like in cases or boxes. The objects so packed are, in many cases, circular in cross section. My U.S. Pat. No. 3,386,224 discloses a case packer which is capable of automatically placing a desired number of layers of objects into a case. It has been found that there is a tendency for non-round or flat type bottles to become canted and to jam the case packer as disclosed in my patent. It is also desirable that improved means be provided for use in a machine of the type disclosed in my patent for maintaining flat bottles and the like aligned in a desired direction.

SUMMARY OF THE INVENTION

One embodiment of this invention might involve in a case packer including a frame, a platform mounted on said frame, a first object conveyor for conveying objects onto said platform, a case conveyor operable to carry cases to a loading position beneath said platform, a lifting head positioned over said platform and adapted to engage a layer of objects for lifting and moving downwardly thereof into a case at said loading position, and means for moving said platform between a first position adjacent said object conveyor and a removed position where it is no longer under said lifting head, the improvement which comprises a second object conveyor mounted on said platform and arranged to convey objects across said platform, said platform having one side adjacent said object conveyor when said platform is in said first position, said conveyor being operable to convey objects away from said one side.

It is one object of this invention to provide an improved case packer.

Another object of this invention is to provide a case packer capable of packing flat objects in a case or box without jamming.

A further object of this invention is to provide a case packer capable of properly aligning flat bottles being packed.

Still another object of this invention is to provide an improved lifting head for a case packer.

Related objects and advantages will appear as the description proceeds.

BRIEF DESCRIPTION OF THE DRAWING

The full nature of the invention will be understood from the accompanying drawings and the following description and claims.

FIG. 1 is a side elevation of a case packer incorporating the present invention.

FIG. 2 is a top plan view of certain portions of the structure illustrated in FIG. 1 and also having certain portions thereof removed for clarity.

FIG. 3 is a side elevation of the structure illustrated in FIG. 2 with certain portions of the structure broken away to show internal construction.

FIG. 4 is an enlarged vertical section taken along the line 4—4 of FIG. 2 in the direction of the arrows.

FIG. 5 is an enlarged vertical section similar to FIG. 4 but taken along the line 5—5 of FIG. 2 in the direction of the arrows.

FIG. 10 is an electrical schematic for certain portions of the illustrated apparatus.

DESCRIPTION OF THE PREFERRED EMBODIMENTS

Figure 6:
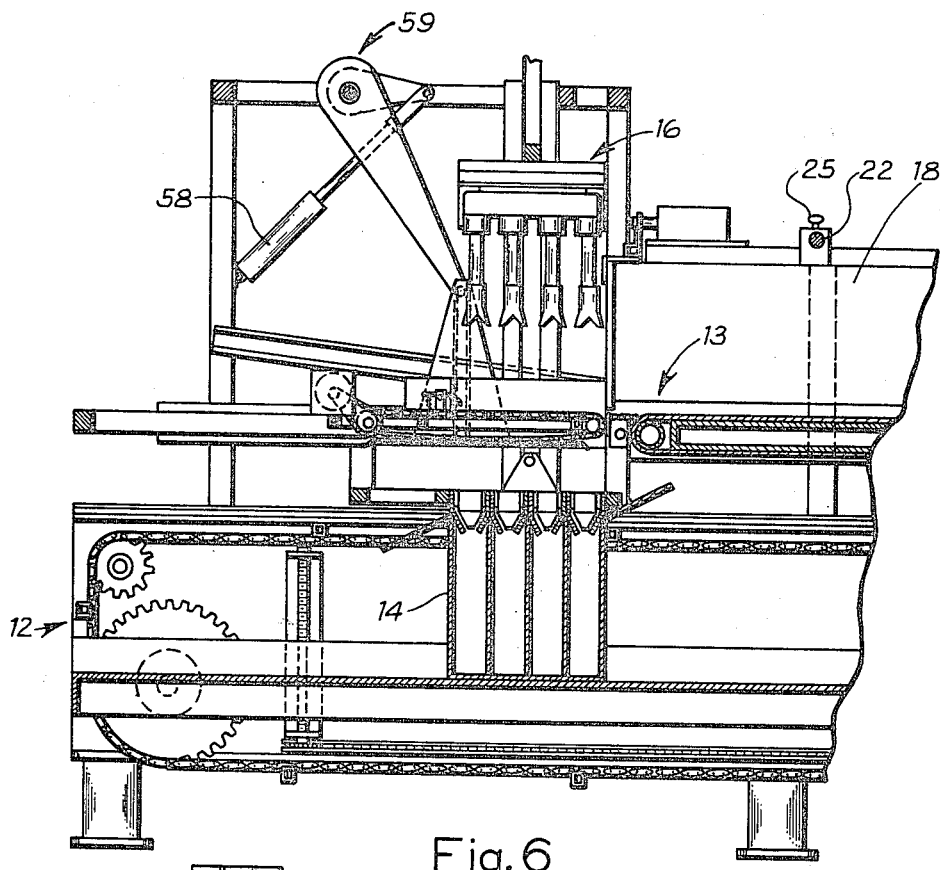
FIG. 6 is a side elevation of the case packer from the opposite side of the apparatus from FIG. 1.
Figures 7, 8:
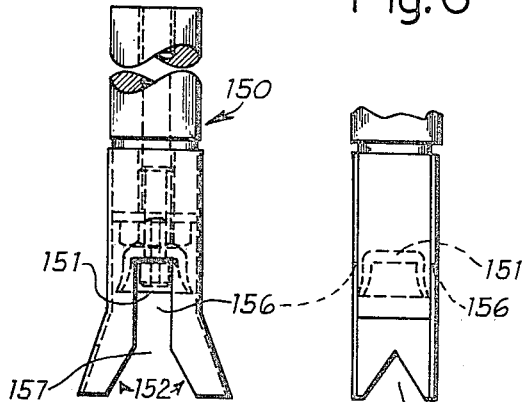
FIG. 7 is an enlarged side elevation of one of the guides and associated vacuum cup forming a part of the structure illustrated in FIG. 1.
FIG. 8 is a side elevation of the structure illustrated in FIG. 7.
Figure 9:
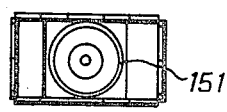
FIG. 9 is a bottom plan view of the guide and vacuum cup of FIGS. 6 and 7.

Referring now more particularly to the drawings, there is illustrated a case packer 10 which includes a frame 11. Mounted upon the frame 11 is a box conveyor 12 and a bottle conveyor 13. The box conveyor 12 operates to convey boxes such as the box 14 across a horizontal surface 15. The box conveyor which is disclosed in detail in my Pat. 3,386,224 operates to move the various boxes along the surface 15 into the position illustrated for the box 14 in FIG. 1. It will be noted that the box 14 is positioned beneath a vertically movable vacuum head 16. The vacuum head 16 functions to lift a pattern of bottles 17 and then to move the bottles downwardly into a respective case or box 14 positioned beneath the vacuum head and on the box conveyor surface 15.

The bottles 17 moving on the conveyor 13 are guided into parallel lines by means of a plurality of guide elements 18, each of the guide elements 18 being fixed to a pair of mounting members 20 and 21. The mounting members are slidable upon a pair of horizontally extending rods 22 and can be adjusted to any desired position on said rods 22 by manipulation of the cap screws 25. This structure is shown in more detail in by Pat. 3,386,-224. As can be seen from FIG. 2, the guide elements 18 are positioned sufficiently closely to one another to cause the bottles 17 which have a relatively flat shape to be lined up with their greatest horizontal dimension extending in the direction of movement of the conveyor 13.

The bottle conveyor 13 is driven by a suitable motor (not shown) at a constant speed. As can be seen from FIG. 1, the conveyor 13 includes a belt 30 mounted and guided upon a suitable roller 31 to which is fixed a sprocket 32. The sprocket has a chain 35 in meshed engagement therewith and arranged to drive a gear 36 fixed to the end of a shaft 37 which is journalled for rotation on the frame 11. Fixed to the shaft 37 is a further sprocket 40 upon which is received in meshing engagement a further chain 41. The chain 41 drives two sprockets 42 fixed to shafts 45 upon which are received tubular rollers 46. As can be seen from FIGS. 2 and 3 the rollers 46 cooperate with the conveyor 13 to move the bottles 17 rightwardly toward a pan or platform 50.

The shaft 37 extends across the apparatus and has fixed at its opposite end a gear 50 which is in mesh with a chain 51. The chain 51 drives gears 52 which are fixed to rollers 55. The structure illustrated in FIGS. 4 and 5 is provided to make possible powered rotation of all of the rollers 46 and 55 and to also permit close spacing of those rollers for better support of the bottles 17 moving across the rollers. The purpose of the rollers 46 and 55 is to provide full conveying action to the bottles 17 all the way to their movement onto the platform 50.

The platform 50 is movable from the position illustrated in FIGS. 1, 2 and 3 rightwardly to a position as shown for example in my above-mentioned patent in FIG. 5 that is, to a position wherein the platform 50 abuts the stop member 53 (FIG. 1) at the rightward portion of the frame 11. The platform has rollers 54 mounted thereon which roll in tracks 56 secured to the frame 11. When the platform is moved to the above mentioned rightward position, the platform 50 is to the right of the head 16 so that bottles picked up by the head 16 can be moved downwardly into the box 14. The box 14 is maintained in position by means of a funnel 57. The funnel 57 which is disclosed in detail in my patent is lifted out of the box 14 when it is time for the box to be moved rightwardly and for a new box to replace the box 14 for filling.

As mentioned, the frame 11 has mounted thereon the tracks 56 between which move rollers 54 secured to the platform. The platform 50 is moved rightwardly and leftwardly by means of a hydraulic cylinder 58 which is coupled to the platform 50 by a linkage 59 described in detail in my patent. For the present disclosure it is sufficient to state that automatic hydraulic means is provided for moving the platform 50 from the position illustrated in FIG. 1 to a position wherein the platform 50 abuts the member 53 and back to the initial illustrated position. There is also provided means for raising and lowering the vacuum head 16. This means consists of the hydraulic cylinder 60, the piston 61 of which is pivotally connected to a lever 62 which is fixed to a sleeve 65, in turn fixed to a further lever 66. The further lever 66 has rotatably mounted at its distal end a roller 67 which rides in a track 70 defined by the channel 71 and fixed to the horizontal members 72 forming a part of the vacuum head 16. The vacuum head 16 is mounted for vertical movement on the frame 11 by means of a roller and track arrangement 80 which is shown in greater detail in my patent. The purpose of the roller-track arrangement 80 is to insure that the vacuum head 16 moves vertically when it is operated upon by the hydraulic cylinder 60 and the connecting structure. The vacuum head is raised and lowered by projecting and retracting respectively the piston 61 of the hydraulic cylinder 60. Because of a relatively greater lever arm of the lever 66 as compared to the lever 62, substantially greater movement of the vacuum head 16 is produced as compared to the movement of the piston 61.

Referring now more particularly to FIGS. 2 and 3, it can be seen that the platform 50 has a bottle conveyor 90 mounted thereon. The bottle conveyor 90 includes an endless belt 91 which is received upon rollers 92. The rollers 92 are rotatably mounted upon the frame 95 of the platform 50. The frame 95 has bearings 96 which provide a rotatable mounting and support for the rollers 92. Fixed to one of the rollers 92 is a sprocket 98 which is meshingly engaged by a chin 97 in mesh with a sprocket 100. The sprocket 100 is driven by a motor 101 mounted on the platform 50.

As shown in FIG. 10, the motor 101 is controlled by a switch 102 which is opened by the closure of the gates 105 hinged upon the guide elements 18. Thus the conveyor no longer moves bottles across the platform after the gates close. The gates 105 are opened and closed by means of a hydraulic cylinder 106. The operation of the gates is disclosed in more detail in my Pat. 3,386,224. It is sufficient for the present description to state that the gates are moved by the hydraulic cylinder 106 to closed position wherein the gates block further movement of the bottles onto the platform when the switch 110 on the platform is operated by the movement of the bottles 17 against the switch 110.

As explained in my patent the switch 110 (362 in my patent), when its circuit is properly conditioned, operates a hydraulic valve which causes the hydraulic cylinder 106 to retract and close the gates 55. The switch 110 is at the rightward end of the area of the platform to be filled. Thus switch 110 will not be operated until the platform is filled.

Mounted upon the platform 50 is a series of guide members 125 which are aligned with the guide members 18. The guide members 125 are spaced above the conveyor 91 and are mounted on mounting elements 126 secured to the frame 95 of the platform 50. The guide members 125 also have fixed thereto a cross member 126 which is also spaced above the conveyor 90 and functions as a stop for limiting the movement of bottles on the platform. Actually the member 126 does not function as the only means for stopping the bottles because of the fact that, as explained above, the switch 110 operates by a series of events to stop the conveyor 90 when the bottles have filled the members 125 and 126 and the pattern has been formed. The structure 127 for actuating the switch 110 is described in detail in my patent.

Thus it can be said that prior to reaching the switch 110 the bottles 17 with their flat configuration are moved and guided first along the conveyor 13, then across the rollers 46 and 55, thence onto the conveyor 90. At all times the bottles are prevented from jamming and are maintained with their greatest horizontal dimension in the direction of the conveyor movement by the guides 18 and 125 as well as by the conveyors 91 and 13 and by the live rollers 46 and 55. However, just as soon as the pattern of bottles is formed on the platform 50, the switch 110 is actuated and the gates 105 close blocking further movement of bottles onto the platform and the vacuum head descends into engagement with the bottles 17 by reason of the retraction of the piston 61.

The vacuum to the vacuum head is switched on and the vacuum head picks up the bottles from the platform 50 by projection of the piston 61. The platform moves rightwardly as viewed in FIG. 1 to a position wherein the platform engages the member 53 and the platform is out of the path of the vacuum head. The vacuum head is then moved downwardly until the bottles are projected down into the box 14. The vacuum is shut off and the bottles deposited in the box. The vacuum head is then returned to the position of FIG. 1 by the hydraulic cylinder 60. The platform 50 moves back to the position of FIG. 1 under the force of the hydraulic cylinder 58. The gates 105 are opened. The various above recited steps are carried out by means of the control apparatus disclosed in my patent although other control apparatus might be used or the apparatus could be moved manually through the various steps of operation.

All the while that the gates 105 are closed, the rollers 46 and 55 are still rotating and the conveyor 13 is still moving. Thus, the opening of the gates starts the bottles to again move onto the platform 50. Also the opening of the gates closes the switch 102 turning on the motor 101 and causing the conveyor 90 to again begin operation. The cycle of operation is complete and the apparatus will continue to repeat the cycle.

The construction of the head 16 is such as to further insure that the flat bottles 17 are all located with their greatest dimension extending in the same direction. Attached to the lifting head are a series of depending guides 150 arranged in an appropriate pattern so that each of the guides is positioned above a respective bottle 17. Each guide 150 has a vacuum cup 151 mounted therein for engaging and lifting the respective bottles. Each guide 150 has a shape which is complementary to its respective flat bottle and each of the guides are oriented in the same direction so as to cause the bottles to also be precisely oriented in the same direction. Normally this direction will be in the direction of movement of the conveyors. However, it is conceivable that in some situations it will be desirable to tilt or cant the bottles so that they are at an angle to the direction of conveyor movement.

Each of the guides 150 includes a pair of rigid depending elements 152 each of which has a inverted V-shaped notch 155 therein. There is also provided a pair of notches 156 in each guide 150 between the rigid depending elements 152. Each of the notches 156 has a lower portion 157 which converges upwardly to provide guiding surfaces for the bottles. Both the notches 155 and the notches 156 act to guide the bottle caps 160 properly into position for engagement with the respective vacuum cup 151. The guides 150 are formed of rigid material while the vacuum cups 151 are formed of flexible material such as rubber or the like.

It will be evident from the above description that the present invention provides a case packer capable of packing flat objects in a box or case without jamming. It will also be evident that the present invention provides a case packer capable of properly aligning flat bottles being packed. It can also be seen that this invention provides an improved lifting head for a case packer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. In a case packer including a frame, a platform mounted on said frame, a first object conveyor for conveying objects onto said platform, a case conveyor operable to carry cases to a loading position beneath said platform, a lifting head positioned over said platform and adapted to engage a layer of objects for lifting and moving downwardly thereof into a case at said loading position, and means for moving said platform between a first position adjacent said object conveyor and a removed position where it is no longer under said lifting head, the improvement which comprises a second object conveyor mounted on said platform and arranged to convey objects across said platform, said platform having one side adjacent said first object conveyor when said platform is in said first position, said second object conveyor being operable to convey objects away from said one side.

2. The case packer of claim 1 additionally comprising a plurality of guide members mounted on said platform above said second object conveyor for guiding objects as they move on said second object conveyor, a plurality of guide elements mounted on said frame above said first object conveyor for guiding objects as they move on said first object conveyor, a plurality of gates each mounted on a respective one of said guide elements, said gates being movable between two positions in a first of which said gates block further movement of the objects on said first object conveyor and in a second of which said gates are aligned with said guide elements and permit said objects to pass by said gates.

3. The case packer of claim 1 additionally comprising means for sensing when said platform is full of objects, means for blocking the movement of objects off of said first object conveyor onto said platform, and means for actuating said blocking means and for shutting off said second object conveyor when said sensing means senses that said platform is full of objects.

4. The case packer of claim 2 additionally comprising means for sensing when said platform is full of objects, and means for moving said gates to said first blocking position when said sensing means senses that said platform is full of objects, a motor for driving said second object conveyor, a switch arranged to be opened by the movement of said gates into said first blocking position, said switch being arranged to shut off said motor when said switch is opened.

5. The case packer of claim 1 additionally comprising a plurality of rollers rotatably mounted on said frame with the upper surface of said rollers in flush relation with said first object conveyor, said first object conveyor being arranged to discharge objects onto said rollers, means driving said rollers at the same speed as said first object conveyor, said platform when in said first position being adjacent said rollers and positioned to receive objects from said rollers.

6. The case packer of claim 4 additionally comprising a plurality of rollers rotatably mounted on said frame with the upper surface of said rollers in flush relation with said first object conveyor, said first object conveyor being arranged to discharge objects onto said rollers, means driving said rollers at the same speed as said first object conveyor, said platform when in said first position being adjacent said rollers and positioned to receive objects from said rollers.

7. The case packer of claim 1 wherein said lifting head comprises a plurality of depending guides arranged in a pattern, a plurality of vacuum cups, each of said vacuum cups being mounted in a respective depending guide, said guides each having a shape which is complementary to flat objects, each of said guides being oriented in a given direction whereby downward movement of said guides onto said objects orients said objects in said given direction.

8. The apparatus of claim 7 wherein said guides each include a pair of rigid depending elements, each of said elements having an inverted V-shaped notch therein for guiding objects, said elements having therebetween a pair of notches, each of said pair of notches having a lower portion which converges upwardly to provide guiding surfaces for objects.

References Cited

UNITED STATES PATENTS

| | | | |
|---|---|---|---|
| 2,666,562 | 1/1954 | Birch | 53—247 |
| 3,327,450 | 6/1967 | Carter | 53—61 |

TRAVIS S. McGEHEE, Primary Examiner

U.S. Cl. X.R.

53—166, 247